US010826723B1

(12) United States Patent
Strauss et al.

(10) Patent No.: US 10,826,723 B1
(45) Date of Patent: *Nov. 3, 2020

(54) VIRTUAL NETWORK ADDRESS SPACE AUTO-MIGRATION

(71) Applicant: Amazon Technologies, Inc., Seattle, WA (US)

(72) Inventors: Benjamin David Strauss, Bethesda, MD (US); David Brian Lennon, Reston, VA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

This patent is subject to a terminal disclaimer.

(21) Appl. No.: 15/903,246

(22) Filed: Feb. 23, 2018

(51) Int. Cl.
*H04L 12/46* (2006.01)
*H04L 12/713* (2013.01)
*G06F 9/455* (2018.01)

(52) U.S. Cl.
CPC ...... *H04L 12/4633* (2013.01); *G06F 9/45558* (2013.01); *H04L 45/586* (2013.01); *G06F 2009/4557* (2013.01); *G06F 2009/45595* (2013.01)

(58) Field of Classification Search
CPC ............... H04L 12/4633; H04L 45/586; G06F 9/45558; G06F 9/4557; G06F 9/45595
See application file for complete search history.

(56) References Cited

U.S. PATENT DOCUMENTS

| 6,662,221 | B1 * | 12/2003 | Gonda | H04L 12/4641 370/254 |
| 8,745,210 | B2 * | 6/2014 | Sekiguchi | G06F 9/5077 709/224 |
| 10,498,693 | B1 * | 12/2019 | Strauss | H04L 61/20 |
| 2013/0058346 | A1 * | 3/2013 | Sridharan | H04L 45/586 370/392 |
| 2014/0325037 | A1 * | 10/2014 | Elisha | H04L 41/0806 709/220 |
| 2015/0324215 | A1 * | 11/2015 | Borthakur | G06F 9/45558 718/1 |

(Continued)

OTHER PUBLICATIONS

Wood, T. et al. "The case for enterprise-ready virtual private clouds" In Proceedings of the 2009 conference on Hot topics in cloud computing (HotCloud'09). USENIX Association, Berkeley, CA, USA, pp. 1-5. (Year: 2009).*

(Continued)

*Primary Examiner* — John M Macilwinen
(74) *Attorney, Agent, or Firm* — Nicholson De Vos Webster & Elliott LLP

(57) ABSTRACT

Techniques for virtual network address space auto-migration are described. An existing network address space of a virtual network can be automatically migrated to a new network address space. The new network address space can be added to the virtual network, new subnets can be added to the new network address space that mirror existing subnets, and new compute instances can be added to the new subnets that mirror existing compute instances. Subsequent to the auto-migration, the virtual network can be connected with another network that has an address space that conflicted with the previous network address space of the virtual network but not the new network address space.

20 Claims, 11 Drawing Sheets

(56) References Cited

U.S. PATENT DOCUMENTS

2018/0034847 A1\* 2/2018 Stella ................. H04L 41/0896
2019/0310881 A1\* 10/2019 Gupta ................. G06F 9/45558

OTHER PUBLICATIONS

Moziz. "Sonicwall: Get an interface overlap error when adding a new VLAN". pp. 1-4. (Year: 2015).\*

Dargin, M. "4 steps to planning a migration from IPv4 to IPv6". NetworkWorld. pp. 1-4. (Year: 2017).\*

\* cited by examiner

VIRTUAL NETWORK ADDRESS SPACE AUTO-MIGRATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
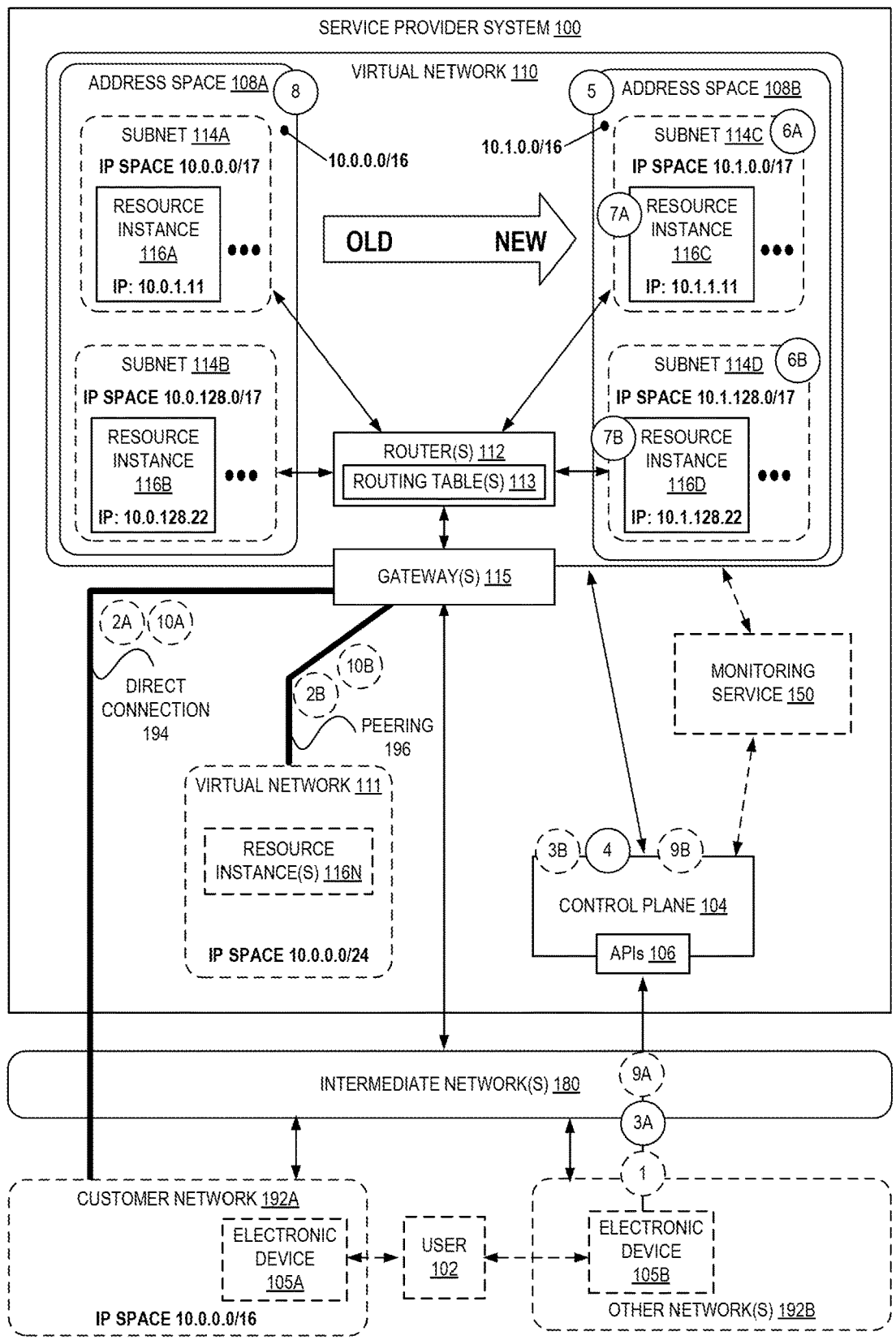
FIG. 1 is a diagram illustrating an environment for virtual network address space auto-migration according to some embodiments.

Various embodiments of methods, apparatus, systems, and non-transitory computer-readable storage media for address space auto-migration in a virtual network are described. According to some embodiments, a configuration of—and entities within—an existing network address space of a virtual network can be automatically changed to be in a new network address space. The migration may be initiated by a receipt of a request from a client, which may indicate the new network address space. The migration can include creating the new network address space within the virtual network, creating subnets within the new network address space that correspond to any subnets in the existing network address space that may exist, and instantiating one or more compute instances within the new network address space that correspond to an existing one or more compute instances within the existing network address space. Upon each compute instance being instantiated or all necessary compute instances being instantiated, the corresponding existing compute instance(s) of the existing network address space can be terminated. Alternatively or additionally, in some embodiments, one or more compute instances within the existing network address space can be caused to change their private network addresses to instead utilize addresses within the new network address space. Any existing subnets in the existing network address space can be removed, and the existing network address space can likewise be removed. Supporting network infrastructural components can likewise be updated or created for the new network address space based on corresponding components of the existing network address space, including but not limited to one or more of setting up auto-scaling groups, virtual firewall rules, updating routes used in network routers, load balancing configurations, etc.

In some embodiments, an auto-migration may be performed responsive to receipt of a request from a client program of a customer that created or manages the virtual network. In some embodiments, the new network address space may be specified by the request, and in some embodiments, the new network address space can be selected based on an analysis of a network address space of a second network to identify an address space that does not conflict with the address space of the second network. In some embodiments, such an identified new network address space can be suggested to a customer be used (i.e., to be migrated to from the existing network address space) without revealing the precise address space utilized in the other network, which may be operated by another customer or entity and thus may desire not to "leak" such network configuration details to others. Thereafter, in some embodiments, upon the auto-migration, the virtual network can be connected to the second network—e.g., via a peering or virtual private networking (VPN) type connection, etc.—such that there does not exist an address space overlap between the networks that would have prevented a successful connection from being created.

Accordingly, a user of a service provider system can quickly and easily re-configure their network via network address auto-migration to allow the network to be connected with other networks that may have had conflicting address spaces which would have resulted in communication problems between the networks or an outright failure when attempting to connect the two.

FIG. 1 is a diagram illustrating an environment for virtual network address space auto-migration according to some embodiments. It is to be understood that the exemplary network address spaces used in the Figures are given by way of example, and are not intended to be limiting.

Embodiments disclosed herein can, for example, be implemented in the context of a service provider system 100 that provides virtualized resources such as compute instances (e.g., virtual machines (VMs), containers, etc.) and potentially other virtual resources such as virtual storage, to customers via an intermediate network 180 such as the Internet. As used herein, compute instances are a type of resource instance (though the terms may be used somewhat interchangeably) and may be, e.g., a virtual machine (VM) using a guest operating system (O/S) that operates using a hypervisor that may or may not further operate on top of an underlying host O/S, a container that may or may not operate in a VM, an instance that can execute on "bare metal" hardware without an underlying hypervisor, etc. The service provider system 100 can include a network substrate and a control plane 104 implemented at one or more data centers, and can host one or more virtual computing services and application programming interfaces (APIs) 106 allowing users 102 to establish, provision, and manage their virtualized resources in virtual networks (e.g., virtual network 110) implemented within the service provider system 100.

In virtual network environments that allow users 102 to provision virtual networks 110, the users' virtual network(s) may be discrete, routed Internet Protocol (IP) areas that are hosted in the service provider system and that may be viewed as virtual analogs to physical data centers. A virtual network 110 may be launched in a service provider system 100 with a customer-specified network address space (e.g., an Internet Protocol Version 4 (IPv4) Classless Inter-Domain Routing (CIDR) block, e.g., 172.31.0.0/20 or 10.0.0.0/16, or alternatively an Internet Protocol Version 6 (IPv6) CIDR block, e.g., 2600:1f16:67d:2000::/56), which may be referred to as a local or private (to the virtual network) IP address space. In some embodiments, virtual networks may be required to use IP address ranges within the private IP address spaces as defined by Internet Engineering Task Force (IETF) Request for Comments (RFC) 1918 for IPv4 as their local IP address space:

10.0.0.0-10.255.255.255 (10/8 prefix)
172.16.0.0-172.31.255.255 (172.16/12 prefix)
192.168.0.0-192.168.255.255 (192.168/16 prefix)

In some embodiments, virtual networks 110 may use IP address ranges within the private IP address space as defined by RFC 4193 for IPv6 (fc00::/7) as their local IP address space. In some embodiments, virtual networks 110 use public IPv4 or IPv6 address ranges as their local IP address space.

In some embodiments, a customer may also specify one or more subnets 114A-114B in their virtual network's IP address space. In some embodiments, a subnet 114 can be specified as the same CIDR block as the virtual network 110 (providing a single subnet in the virtual network), or alternatively one or more CIDR blocks that are subsets of the CIDR block of the virtual network can be specified to provide one or more subnets in the virtual network. As one example, a customer could create a virtual network 110 with the CIDR block 10.0.0.0/24, which supports 256 IP addresses. The customer may, for example, break this CIDR block into two subnets, each supporting 128 IP addresses, where one subnet uses CIDR block 10.0.0.0/25 (for addresses 10.0.0.0-10.0.0.127) and the other subnet uses CIDR block 10.0.0.128/25 (for addresses 10.0.0.128-10.0.0.255). As shown, the virtual network 110 may include an initial or existing network address space 108A of 10.0.0.0/16 having two subnets—subnet 114A with a CIDR block of 10.0.0.0/17 and subnet 114B with a CIDR block of 10.0.128.0/17—that effectively split the overall existing network address space 108A in half.

A customer (here, represented as user 102) may provision and manage a virtual network 110 of the service provider system 100, which may occur from an external network 192B (or customer network 192A) over one or more intermediate networks 180 such as the Internet via one or more APIs 106 to a control plane 104 of the service provider system 100. For example, the customer may manage their virtual network 110 from graphical user interfaces (GUIs) and/or command line interfaces (CLIs) from a console (e.g., electronic device), which may be in customer network 192A or 192B, that issues API calls to one or more API endpoints (e.g., APIs 106) of the service provider system 100 to request that certain provisioning and/or management operations be performed. For example, the user 102 may configure, via one or more API calls (e.g., HyperText Transfer Protocol (HTTP) GET or POST messages sent that call/identify "exposed" functions of the API), one or more compute instances 116A-116B and/or a virtual network 110 to be implemented and configured to perform certain operations (e.g., implement a web site, provide a video streaming service, host a database, process data, etc.). In some embodiments using an API, the API is a REpresentational State Transfer (REST) (or "RESTful") web service and thus the API requests may adhere to a set of uniform, predefined stateless operations. Note that virtual network 110 may include other components than those shown in FIG. 1.

Virtual network 110 may include compute instances 116A-116B such as virtual machines executed on host devices of the service provider system 100. Virtual network 110 may also include networking devices such as one or more gateways 115 and/or one or more routers 112. In at least some embodiments of a service provider system 100, virtual network 110 networking devices such as gateways 115 and routers 112A may be virtual networking devices (e.g., implemented as a software entity, which may execute on general purpose or specialized hardware) of the service provider system 100. A virtual gateway 115 or router 112 may, for example, be implemented in the hypervisor on a host device. A hypervisor, or virtual machine monitor (VMM), on a host device may be described as the software, firmware, and/or hardware that provides an execution environment for the virtual machines on the host device. Network traffic to and from the virtual machines executing on a host device may pass through and be processed by the hypervisor on the host device. Alternatively, a gateway 115 or router 112 may be implemented as a virtual machine executing on a host device of the service provider system 100. As another possibility, a gateway 115 or router 112 may be implemented as a physical networking device of the service provider system 100, or as a virtual device on a networking device of the service provider system 100.

In some embodiments, the service provider system 100 allows the customer to establish a dedicated network connection, referred to as a direct connection 194, from a customer network 192A (e.g., located outside the service provider system 100, such as within a data center) to virtual network 110 within the service provider system 100. The direct connection 194 may, for example, be established between a gateway 115 of virtual network 110 (e.g., a "virtual private gateway") and a gateway at customer network 192A. A direct connection 194 may be a private communications channel, and may provide secure communications and higher bandwidth throughput than is available over a typical Internet-based connection. Once a direct connection 194 is established between virtual network 110 and customer network 192A, routing tables 113 used by router(s) 112 in virtual network 110 and router(s) in customer network 192A may be configured with routes for the direct connection 194, and endpoints in the two networks may then begin communicating over the direct connection 194. In some embodiments, virtual network 110 is not allowed to have any IP address space(s) that partially or completely overlap with the IP address space(s) of an external network 192A to which a direct connection 194 is established.

Packet flows between endpoints in different private networks 110 of the service provider system 100 (e.g., compute instance 116A and compute instance 116N) may be routed through the network substrate of the service provider system 100 to an intermediate public network 180 such as the Internet. The intermediate network 180 may then route the packets back to the service provider system 100. In the service provider system 100, the packets are then routed over the network substrate to the destination private network. In some embodiments, to provide a virtual analog to physical transit centers at which physical cables between data centers are patched to create a peering between the respective private networks at the data centers in the virtual network environment within a service provider system 100, a peering service and API may be provided by the service provider system 100 that allows customers to request and accept virtual peerings 196 between virtual networks 110A-110B of the service provider system 100. A private network peering 196 allows packets to flow between endpoints in the two private networks 110A-110B via the service provider system 100 network substrate without passing through the intermediate public network 180. Once a peering 196 is established between two virtual networks 110A-110B, routing tables (e.g., routing table(s) 113) used by router(s) 112 in the private networks 110 may be configured with routes to the peering 196 connection, and endpoints in the two private networks 110 may then begin communicating over the peering 196 as if the two virtual networks 110 were connected by a physical cable. FIG. 1 shows a potential virtual peering 196 connection between virtual network 110 and virtual network 111. In some embodiments, peered private networks 110 are not allowed to have partially or completely overlapping IP address spaces.

In this example, virtual network 110 has been created with an initial IP address space (in this example, the IPv4 CIDR block 10.0.0.0/16), which allows for up to 65,536 distinct IP addresses (assuming that the full address space is allowed to be used by the user). In this example, two subnets, subnet 114A with CIDR block 10.0.0.0/17 (allowing for up to 32,768 distinct IP addresses) and subnet 114B with CIDR block 10.0.128.0/17 (allowing for up to 32,768 distinct IP addresses), have been created in the IP address space of the virtual network 110. Compute instance 116A (and potentially other, non-illustrated instances) are assigned IP addresses in the IP network address space of subnet 114A (e.g., 10.0.1.11), and compute instance(s) 116B are assigned IP addresses in subnet 114B (e.g., 10.0.128.22). In some embodiments, each subnet 114A-114B may include at least one router 112 that acts to route traffic to (and from) compute instances 116A-116B of the respective subnet 114A-114B.

While not shown in FIG. 1, in some embodiments a service provider system 100 may include one or more regional networks. Each regional network may include multiple availability zones (AZs). Each AZ may be implemented by one or more data centers within the respective regional network; a data center may implement one or more AZs. The AZs in a regional network may be connected through low-latency links (e.g., dedicated high-bandwidth fiber-optic links) and collectively form the regional network. Communications between endpoints in different AZs within a regional network may go over the intermediate network 180 or over the low latency links. When a customer creates a virtual network 110 in a regional network, the virtual network 110 may span all the AZs in the regional network. After creating the virtual network 110, the customer can add one or more subnets 114 in each AZ. When a customer creates a subnet 114 for virtual network 110 in an AZ, the customer may specify the CIDR block(s) for the subnet, which is a subset of the virtual network 110 CIDR block. In some embodiments, each subnet 114 resides entirely within one availability zone and does not span availability zones. By launching compute instances 116A-116B in separate availability zones, the customer can protect their applications from the failure of a single availability zone.

Control plane 104 may maintain metadata about private networks 110A-110B on provider network, for example in a control plane (CP) data store (non-illustrated). CP data store may include a descriptor record for each private network 110 in the service provider system 100. When a customer creates or modifies a virtual network (e.g., virtual network 110), information about the virtual network 110 may be written to, updated in, or read from a descriptor record in the CP data store corresponding to that virtual network 110. A descriptor record for a private network may include descriptions of the private network's network address space (e.g., CIDR blocks). A descriptor record for a private network 110 may include one or more of, but is not limited to: the private network name, a private network identifier, one or more CIDR blocks of the private network 110, subnet(s) of the private network 110, information identifying other private networks 110 that are peered with the private network 110, information about external network(s) 192 that are connected with the private network 110 via direct connections 194, routing information for the private network 110, and so on.

Service provider system 100 may implement one or more services that may perform various functionalities for private networks 110. For example, a (non-illustrated) metadata service may execute in the service provider system 100, for example on each on host device that executes VMs, that exposes an interface to compute instances 116 that allows an executing compute instance 116 to obtain metadata about its respective private network 110 (e.g., information about the private network's IP address space(s), etc.) and metadata about the compute instance 116 (e.g., its media access control (MAC) address, local IP address, etc.). As another example, a direct connect service may support the establishment and management of direct connections I 94 to external networks 192 from private networks 110. As another example, a peering service may support the establishment and management of peering 196 connections between private networks 110.

As indicated above, a customer may not be able to connect a virtual network 110 with another network—such as a virtual network 111 via a peering 196 or an external customer network 192A via a direction connection 194—if there is any address space overlap between these networks. As shown in FIG. 1, the address space 108A (10.0.0.0/16) of the virtual network 110 does overlap with both customer network 192A (10.0.0.0/16, which is a complete overlap) as well as virtual network 111 (10.0.0.0/24, which is a partial overlap).

Thus, upon a user 102 (via electronic device 105B) submitting a request at circle '1' to the service provider system 100 (to an API 106 endpoint) to connect the virtual network 110 with one of these other networks 111/192A (as would occur at optional circles 2A-2B), the control plane 104 may detect such an overlap and refuse to create the connection. However, in some embodiments the control plane 104 may also naively attempt to create the connection (under an incorrect assumption that no address space conflict exists), and may detect the overlap during this process, or may not detect the overlap at all—leaving a potentially "broken" connection, where traffic originated from one virtual network 110 may not be able to reach the true intended destination endpoint in the other network 111/192A.

Figure 4:
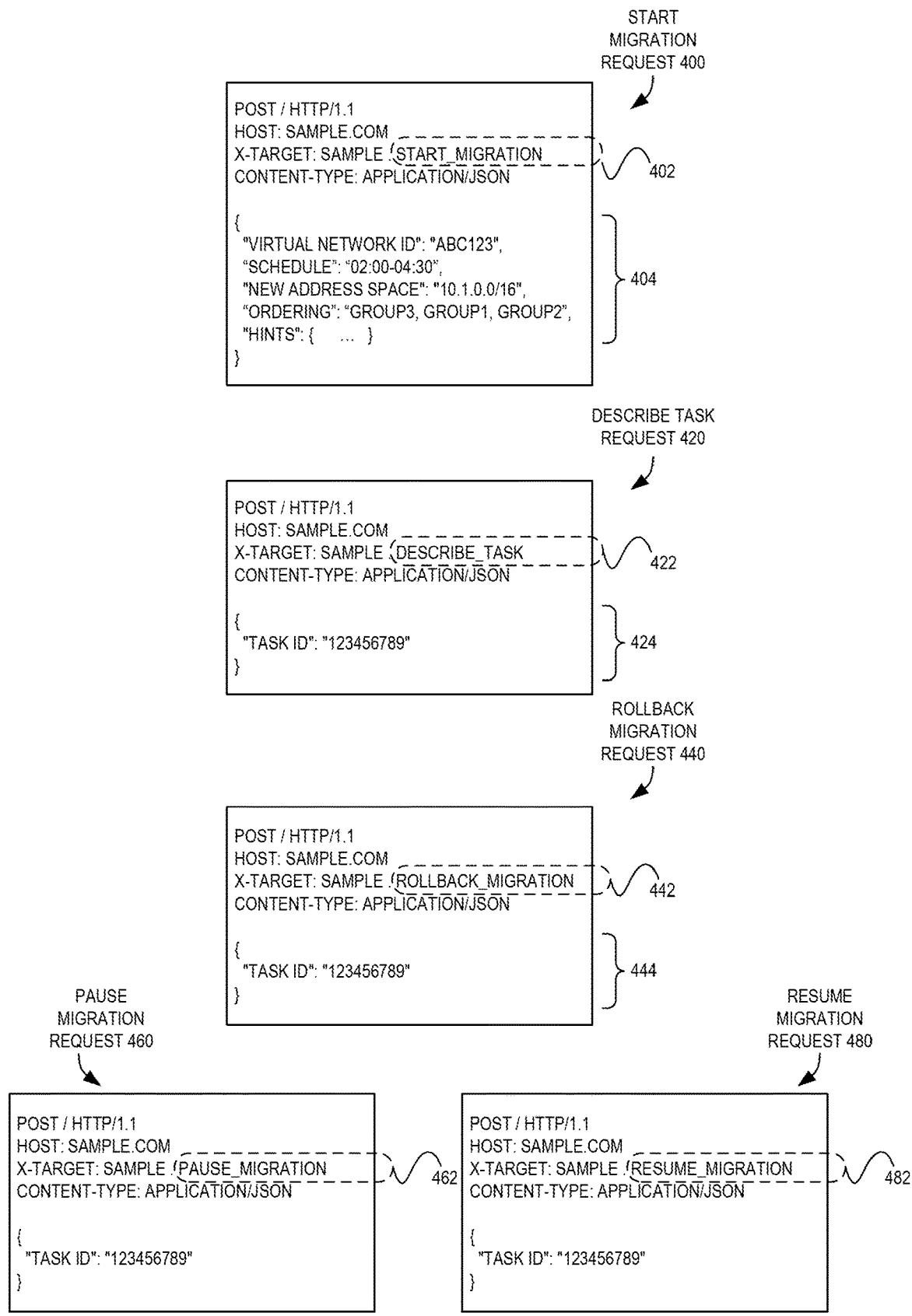
FIG. 4 is a diagram illustrating exemplary application programming interface requests for virtual network address space auto-migration according to some embodiments.

In some embodiments, the user 102 may thus cause a "start migration" request to be sent at circle '3A' (e.g., as an API request) by electronic device 105B to be received by the control plane 104. For example, upon the user 102 observing that a desired connection was not able to be created (e.g., via a GUI of a console provided by the service provider system 100), the user 102 may submit a form (e.g., via filling out one or more user input element fields, clicking or selecting a button, etc.) indicating that the address space 108A is to be automatically "migrated" to a different address space 108B that is still part of the same virtual network 110. One example of a start migration request 400 is shown in FIG. 4, which is a diagram illustrating exemplary API requests for virtual network address space auto-migration according to some embodiments. This example includes a few illustrative fields of an API request (e.g., an HTTP POST message), including a "target" attribute 402 (that specifies a function to be performed) identifying "start_migration" and one or more elements 404.

Notably, FIG. 4 shows aspects of several requests 400/420/440 that can be used in various embodiments. Each request can be an HTTP request message carried by one or more packets that are destined to an API 106 endpoint of the service provider system 100. In some embodiments, a graphical user interface (GUI) to API 106 may be provided on a console on customer network 192A or other network 192B via which the user may, for example, request auto-migration operations for virtual network 110. In some embodiments, other methods may be used instead of or in addition to a GUI to access functionality of the API 106, including but not limited to using a command line interface (CLI), application, etc.

In some embodiments, the start migration request 400 may include, as one or more of elements 404, an identifier of the particular virtual network 110 that is to have its address space migrated (allowing the control plane 104 to identify the involved virtual network 110)—e.g., a "virtual network ID" value of "ABC123." The request may also optionally include a non-illustrated identifier of one or more particular address spaces to be migrated (e.g., an "existing network address space" value of "10.0.0.0/16"), which may be useful if a particular virtual network 110 has multiple address spaces and one (or more) need to be migrated.

In some embodiments, the request may include, as one or more of elements 404, a schedule (or "scheduling") identifier indicating conditions for when a migration may or may not be performed. For example, as shown in FIG. 4, a schedule attribute has a value of "02:00-04:00" which may indicate that the migration can only be performed between the hours of 2 am-4 am. However, a schedule attribute may be configured to additionally or alternatively accept other types of conditions, such as indicators of what time during the day the migration cannot be performed, indicators of what days of the week, month, etc., the migration can or cannot be performed, a maximum or minimum amount of the resources to be migrated (e.g., compute instances) can be moved during any single phase of the migration, etc.

In some embodiments, the request may include, as one or more of elements 404, an identifier of a "new" address space (e.g., a "new network address space" value of "10.1.0.0/16") that the existing network address space is to be migrated to. The new network address space may be selected or provided by the user 102.

In some embodiments when a new network address space is stipulated by the user, the control plane 104 may perform a set of conflict check operations. The conflict check operations may include determining whether a sufficient network address space is available that can be migrated to and/or that do not create network address conflicts.

For example, in some embodiments the control plane can check to ensure that the user is not attempting to migrate to an address space (e.g., a CIDR block) that overlaps with other network address spaces that are associated with another network sought to be connected to (e.g., the IP address space of external network 192A to be connected to the virtual network 110 via direct connection 194, and/or the IP address space of private network 110B to be connected to virtual network 110 through peering 196). In some embodiments, the control plane 104 may access virtual network 110's descriptor record in CP data store to obtain the IP address space information to be checked for overlaps with any new network address spaces (e.g., CIDR block(s)).

In some embodiments, the new network address space may be suggested by the control plane 104. For example, in the case of a failed peering of the virtual network 110 with the virtual network 111, the control plane 104 can determine one or multiple different address spaces, of a same size as the existing network address space, that would not overlap with the address space of the virtual network 111. Notably, in some embodiments, the virtual network 110 and virtual network 111 may be owned/operated by different organizations/users, and thus, the control plane 104 may have the ability to analyze the address space of each virtual network to arrive at a suggested address space without needing to reveal the particular details of the virtual networks to the other user(s). This can beneficially increase the security of both users' virtual networks by not revealing the precise particular address range(s) that are in use. Thus, the control plane 104 may present one or more suggested network address ranges to the user 102 (e.g., as part of a GUI of a console), who may select one of the suggested network address ranges or input a different network address range.

In some embodiments, the start migration request 400 can include as one or more of elements 404, values for an "ordering" attribute indicating a particular order of resources (e.g., resource instances) to be migrated. For example, a user may desire that a first group of resources (e.g., load balancers) are migrated before a second group of resources (e.g., a set of one or more databases and/or data stores for an application), which itself is to be migrated before a third group of resources (e.g., a stack providing frontend services for an application). Thus, the request 400 may include identifiers of some form—such as group identifiers shown in FIG. 4 ("GROUP1" and the like, which can be predefined for the user within the service provider system or defined elsewhere within the request 400) or with explicit identifiers of resource instances, resource "types", etc.

In some embodiments, the request 400 may include, as one or more of elements 404, one or more network structure hints (attribute shown as "hints", values not illustrated). The network structure hints could be in JavaScript Object Notation (JSON) format, for example, and include descriptions of one or more of: identifiers of compute instances within the virtual network, types of compute instances (e.g., from standard VM types/sizes provided by the service provider system 100), dependencies of the compute instances, indications of what other services (e.g., provided by the service provider system 100) are being used within the virtual network and potentially by which compute instances, types of applications executed by the compute instances, network addresses used in the virtual networks, etc. In some embodiments, the user need not provide any hints, which can be beneficial in that it relieves the user from needing to define how a migration is to occur or specify particular network configurations, and instead can allow the user to rely upon the service provider system to take care of the implementation. However, in some scenarios, a user may have better visibility (or understanding) into the particular configuration of the involved virtual network, and thus customer-specified hints may be beneficial. As another example, a value within the hints in some embodiments provides an indication of auto-migration "exemptions" that specify one or more resources (e.g., compute instances or other resources) that are not to be automatically migrated.

Turning back to FIG. 1, the start migration request may be originated by the user on his/her own accord (e.g., by navigating to a page/portion of a console or other application and providing user input to issue the request), though in some embodiments the commencement of an auto-migration could alternatively occur due to the control plane 104 detecting a failed peering attempt or direction connection attempt. For example, upon a user submitting a request to connect the virtual network 110 to another network, the control plane 104 could automatically perform an auto-migration (e.g., when the user has explicitly indicated a desire for such an action). As another example, when reporting that the connection cannot be made, the control plane 104 may also identify a non-conflicting address space, and suggest the new network address space and ask the user 102 to confirm whether the control plane 104 should perform the auto-migration accordingly.

In some embodiments, at optional circle '3B', the control plane 104 may generate and optionally present a migration plan to the user. For example, the control plane 104 in some embodiments analyzes the virtual network 110 (directly, and/or via system records/logs) to identify one or more of the existing network address space 108A, the new network address space 108B, any existing subnets 114A-114B, sizes of existing subnets, subranges in the overall network address space 108A that the subnets utilize, any existing compute instances 116A-116B, other configuration data associated with the virtual network (e.g., routes, virtual firewall rules/settings, load balancing settings, connected services, etc.), and use this information to create a plan indicating what entities will be changed, how they will be changed (e.g., added, removed, edited), and when (in the context of the auto-migration) the entities will be changed. In some embodiments, this auto-detected information (from the perspective of the control plane 104) may be compared and/or supplemented with user-provided network structure hints. Such a migration plan may be provided the user, and in some embodiments the user may accept the plan or modify (and then submit) the plan for migration.

Figure 2:
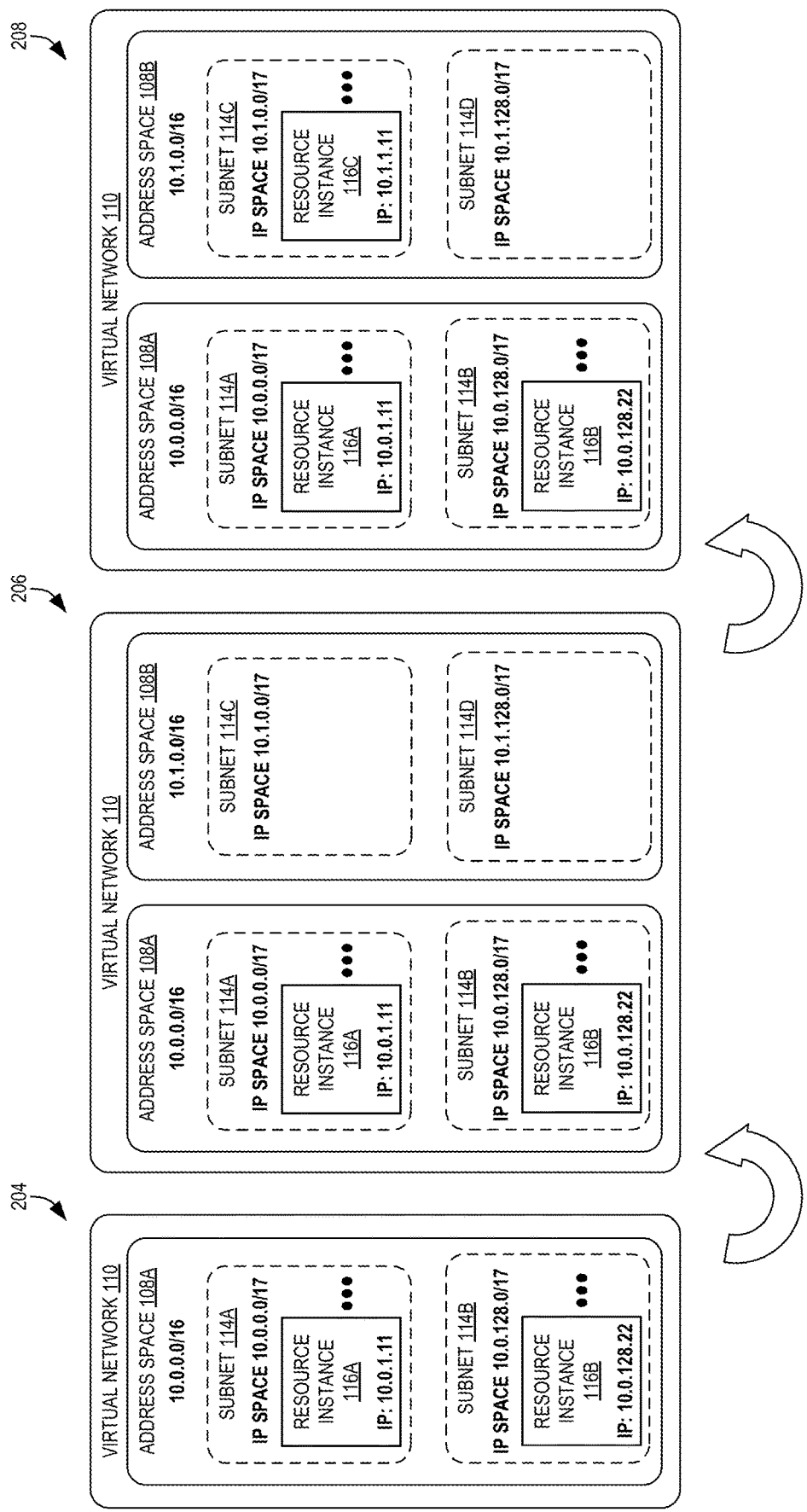
FIG. 2 is a diagram illustrating exemplary operations for virtual network address space auto-migration according to some embodiments.

At circle '4', the control plane 104 may begin an auto-migration to a new network address space 108B of (10.1.0.0/16). For further detail, FIG. 2 is a diagram illustrating exemplary operations for virtual network address space auto-migration according to some embodiments. At 204 the existing compute instances 116A-116B exist within the existing subnets 114A-114B, which are within the existing network address space 108A of the virtual network 110. Moving to 206, in some embodiments, the auto-migration includes allocating a new network address space 108B within the virtual network 110 (also shown at circle '5' of FIG. 1) and creating new subnets 114C-114D within the new network address space 108B (also shown at circles '6A'-'6B' of FIG. 1).

The new subnets 114C-114D can be created to "mirror" the existing subnets 114A-114B in that they each match the size of a corresponding subnet, may be similarly situated within the address space, may exist within particular regions or locations, etc. For example, in this case the two existing subnets 114A-114B are of the same size and each occupy half of the existing network address space 108A—thus, the new subnets 114C-114D (although having different address ranges within the new network address space 108B) include the same number of subnets and are of the same size as corresponding subnets 114A-114B. As another example, an existing network address space could have one subnet that only consumes an initial one-fourth of an address space, and thus a "new" subnet can be created in the initial one-fourth of the new network address space.

Thereafter, new compute instances 116C-116D can be launched within the new subnets 114C-114D at locations (and configurations) that correspond/mirror the existing compute instances 116A-116B of the existing network address space 108A. In some embodiments, the new compute instances 116C-116D may all be created at once—e.g., sequentially, partially or completely in parallel, etc.—before moving on. However, in some embodiments, one (or more, but fewer than all) compute instances may be instantiated and then the existing versions thereof may be terminated. This process can provide a benefit in that an overall number of compute instances that need to execute at one time can be significantly reduced (e.g., to N+1, where N is the number of resources instances to be moved) whereas a complete instantiation of all compute instances may require 2*N instances. Thus, potentially significant amounts of resources can be preserved during the auto-migration that may be thus available for other users, etc.

Figure 3:
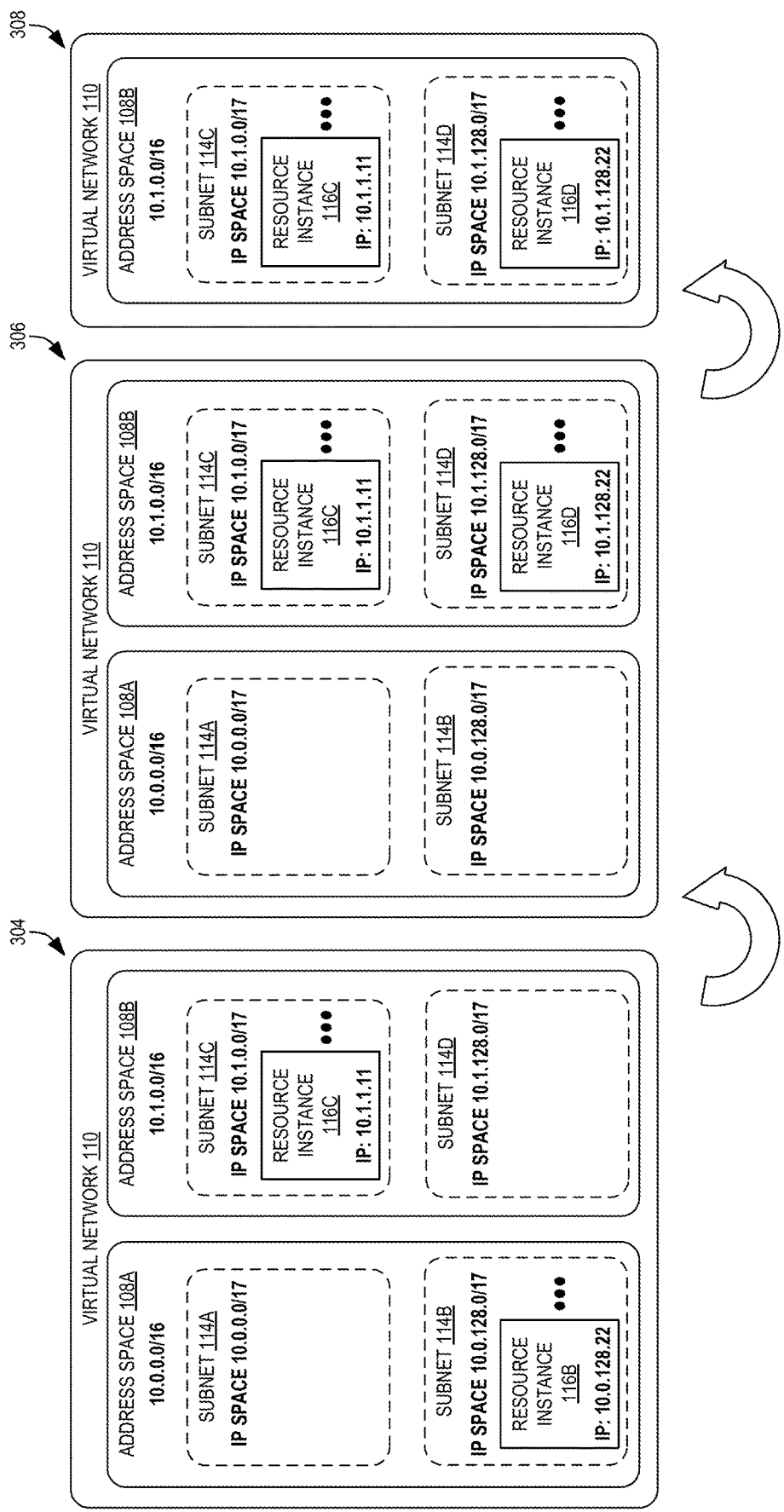
FIG. 3 is a diagram illustrating exemplary operations subsequent to those of FIG. 2 for virtual network address space auto-migration according to some embodiments.

Thus, at 208 (and also shown at circle '7A' of FIG. 1) a first compute instance 116C can be instantiated in subnet 114C that corresponds to compute instance 116A of subnet 114A. In some embodiments, to migrate a compute instance, a snapshot of the compute instance is created and used to re-launch the compute instance and thus both may exist for a point in time. However, many other techniques are known to those of skill in the art, such as launching a same type/size of compute instance and optionally installing the same applications/software upon the instance as execute on the existing instance 116A (and/or configuring the instance). As another example, a database could be migrated by instantiating compute instance, optionally installing database software, configuring the database to replicate data from the existing database, configuring the database to be a new "master" (while the existing database is changed to "slave"), etc. Continuing with FIG. 3, at 304 the corresponding existing compute instance 116A can be terminated from the existing subnet 114A (also shown at circle '8' of FIG. 1). Likewise, a continued pattern of compute instance instantiation and corresponding termination may continue as shown at 306, where a second compute instance 116D is created in subnet 114D and the corresponding compute instance 116B can be terminated (as shown at circle '7B' and '8' of FIG. 1).

In some embodiments, before terminating an "old" corresponding compute instance, the control plane 104 can modify or create infrastructural components that reference (or are implemented for) the "old" instance or address space and cause them to be updated to instead reference the "new" compute instance or address space. For example, one or more routes to and/or from a network address of an old compute instance can be modified to instead reference the "new" network address of the corresponding new compute instance. A variety of other types of examples exist in different environments, such as configuring virtual firewall (or "security group") rules for a new compute instance based on existing rules associated with the existing compute instance, setting up auto-scaling and/or load balancing functionalities, etc.

As another example, certain addresses within the new network address space may be reserved or assigned, such as a network address within the address space being reserved for a Domain Name Service (DNS) functionality. As another example, other services provided by the service provider system 100 that are utilized within the existing network address space can be identified and configured for use within the new network address space (e.g., via issuing API calls to deregister the "old" resource and to register the "new" resource), such as a storage service, etc. As another example, in some embodiments, the control plane 104 may update virtual network 110's descriptor record to reflect the new network address space instead of the old network address space.

Thereafter, at 308, the now-empty existing subnets 114A-114B can be terminated and then the address space 108A can similarly be eliminated from the virtual network 110 to result in the complete auto-migrated "new" address space 108B.

Alternatively, the migration of some or all resource instances into a new network address space may not include the instantiation of new resource instances and/or the termination of corresponding "old" resource instances. In some embodiments, an existing resource instance can be moved into a new address space by causing the resource instance to change its private network address (within the existing, or "old" network address space) to instead utilize a new private network address within the "new" network address space. For example, a software agent can be deployed within a resource instance that can detect a migration event (e.g., via polling an API, or otherwise watching for—or being notified of—a migration event) and, upon detecting such a migration event, can cause the resource instance to change its network address from the old address space into the new. By way of example, with a resource instance that is a Windows VM, a software agent could issue release and renew commands (e.g., "ipconfig/release" and "ipconfig/renew") to cause the VM to request a new network address (e.g., from a DHCP server); similar commands are known to those of skill in the art for other types of resource instances such as Unix/Linux VMs (e.g., via "dhclient" or "ifconfig" commands), etc. Moreover, in some embodiments, a software agent may instead cause a static network address used by the resource instance to be switched to utilize a new static network address in the new address space. In some embodiments, these techniques may be combined with changing metadata (related to particular network addresses being used) about the virtual network that the resource instance(s) operate within—e.g., updating the virtual network mappings, virtual firewall mappings, data structures describing the virtual network, etc.

At various stages of an auto-migration, a user may seek to determine what the status of the task is. Turning again to FIG. 4, in some embodiments, the user may navigate to a job status user interface or may otherwise issue (via electronic device 105B) a describe task request 420 to a target 422 of "describe_task" including an element 424 of a "task ID" (here, shown as "123456789"). In some embodiments, after the control plane 104 receives a start migration request 400, the control plane 104 may provide, in a response message, a task identifier (ID) associated with the auto-migration. This task ID can be used within the describe task request 420 to solicit further information about a current status of the auto-migration. As a response, the control plane 104 may send a response message indicating a status, e.g., "completed," "pending," "in progress," "failed," etc. The response message may also include a status description that describes in greater detail one or more of what actions are currently being performed, what actions have already been performed, what compute instances or resources have been migrated, what errors have been encountered, etc.

In some embodiments, the user (via electronic device 105B) may also issue a rollback migration request 440 with a target 442 of "rollback_migration" and including an element 444 of a "task ID" (here, shown as "123456789"). Such a request can signal an intent of the user to "undo" the auto-migration, which may be due to a migration failing for some reason, the user deciding that a peering or direction connection is no longer needed, etc. Thus, in some embodiments, the control plane 104 can "undo" the auto-migration by re-creating the original address space, re-creating the original subnets (if any), re-instantiating compute instances (or changing back network addresses), re-configuring any needed infrastructural components, etc., and removing any migrated compute instances, new subnets, and/or new network address spaces from the virtual network 110.

In some embodiments, the user via electronic device 105B may send a pause migration request 460 with a target 462 of "pause_migration" and including an element of a "task ID" (here, shown as "123456789"), signaling the user's interest in the migration being stopped in its current state or in a next consistent state (e.g., where a complete resource is successfully migrated, instead of only being partially migrated). A pause migration request 460 may be sent, for example, upon a user determining that the migration is not proceeding correctly, or has changed their mind about the need for a migration. As a counterpart message, in some embodiments, the user via electronic device 105B may send a resume migration request 480 with a target 482 of "resume_migration" and including an element of a "task ID" (here, shown as "123456789"), signaling the user's interest in a paused migration being restarted.

Turning back to FIG. 1, after the auto-migration, the user 102 may further configure or utilize the virtual network 110. For example, the user 102 may send a request at optional circle '9A' to connect the virtual network 110 with another network (e.g., a direction connection 194 at circle '10A' with customer network 192A, a peering 196 at circle '10B' with virtual network 111), which should succeed due to the network address space conflict no longer existing.

Alternatively, in some embodiments the control plane 104 can connect the virtual network 110 with another network (e.g., automatically, or with some user input or advance permission) upon the conclusion of the auto-migration, such as when the control plane 104 is able to determine that a failed connection resulted in the auto-migration.

If such a connection is made, endpoints on external networks 192 or virtual network 111 may communicate with endpoints of virtual network 110 (e.g., compute instances 116C-116D). Network traffic (e.g., IP packets) from the external endpoints to endpoints in the virtual network 110 may be routed over the intermediate network 180 to an edge device of the service provider system 100. At the edge device, the packets may be encapsulated and routed over the network substrate of the service provider system 100 to a gateway 115 that controls public access to the virtual network 110. The gateway 115 forwards network packets to routers 112 of the virtual network 110, which route the packets to the appropriate compute instances 116C-116D on the respective subnets 114C-114D according to routing information maintained in route table(s) 113 for the virtual network 110. Similarly, network traffic (e.g., IP packets) from the compute instances 116C-116D may be routed to the gateway 115, which sends the packets over the network substrate to an edge device of the service provider system 100 to be routed over the intermediate network 180 to respective endpoints in the external networks 192. In addition, endpoints (e.g., compute instances 116N) in virtual network 111 may communicate with compute instances 116C-116D through the peering 196 connection.

In some embodiments, the service provider system 100 further includes a monitoring service 150 that can monitor the status of an auto-migration and directly or indirectly cause user-configurable actions to be performed responsive to particular occurrences or outcomes arising from the auto-migration. In some embodiments, the control plane 104 may send "event" updates each representing a particular operation performed as part of an auto-migration to the monitoring service 150. For example, the control plane 104 may send an update upon a successful or unsuccessful addition/removal of an address space, addition/removal of a subnet, addition/removal of a resource instance, addition/removal of a configuration, etc. However, in some embodiments, the monitoring service 150 may be able to have visibility into auto-migration operations using other techniques known to those of skill in the art, such as by monitoring a shared log or shared data structure/hardware structure, observing network traffic (e.g., carrying commands and/or carrying responses to those commands indicating a success or failure), etc. Thus, with visibility into the operations of an auto-migration, the monitoring service 150 can detect issues or potential problems and can act in response. For example, the monitoring service 150 can be configured to, upon detecting a particular type of failure/problem, send a message (e.g., to the control plane 104) to pause an auto-migration and/or perform an auto-rollback of the auto-migration, send a message to notify a user 102 and/or employee of the service provider system 100, etc. The particular types of failures/problems that can be detected and/or the responses thereto may be configured by the service provider system 100 and/or by the involved user 102 whose virtual network 110 is involved. For example, a user 102 may (via request messages sent from an electronic device 105 to the service provider system 100) configure the monitoring service 150 to perform an auto-rollback of an auto-migration upon a particular type of problem arising (e.g., a failure to launch a particular resource instance, a failure involving a configuration of a new address space, a failure of communication ability between resource instances of a "new" subnet, etc.), upon a particular resource being affected (e.g., when one or more particular resource instances are affected by a problem), etc.

In some embodiments, these described auto-migration techniques can be used to migrate some or all of a virtual network 110 within a service provider system 100 from IPv4 to IPv6. For example, a user may have a virtual network 110 configured to exclusively use IPv4 addressing and may wish to change the network to make use of IPv6 addressing instead. Accordingly, in some embodiments the control plane 104 can add an additional address space 108B with IPv6 addresses, and perform similar operations as described above to eliminate the use of IPv4 addresses.

As another example, in some embodiments, a user can utilize auto-migration techniques disclosed herein to migrate a resource or a set of resources from public IP subnets to private IP subnets. For example, a user may have created a virtual network (e.g., in a service provider system) using their own public IP space (e.g., 1.2.0.0/16) to emulate a "flat network" with an on-premise environment of the user. Thereafter, a user may determine that they no longer want some—or all—of the resources in the virtual network of the service provider system to be publicly reachable, and can, for example, request that the system perform an auto-migration of some or all of these resources from the public IP space into a different, private IP space—e.g., from a public IP subnet of 1.2.3.0/24 to a private IP subnet of 10.2.3.0/24.

Figure 5:
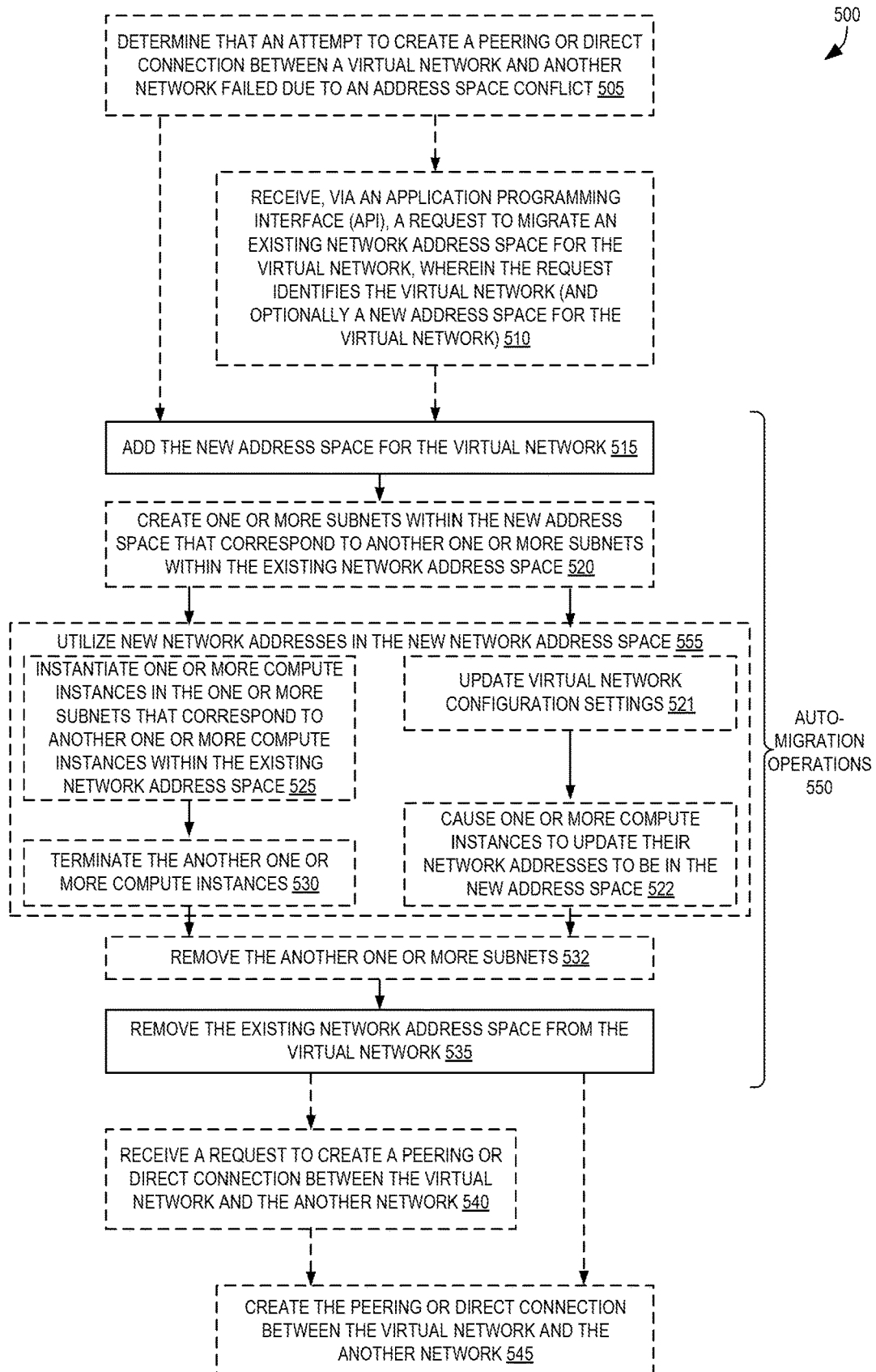
FIG. 5 is a flow diagram illustrating exemplary operations for virtual network address space auto-migration according to some embodiments.

FIG. 5 is a flow diagram illustrating exemplary operations for virtual network address space auto-migration according to some embodiments. Some or all of the operations 500 (or any other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the control plane 104 of the other figures.

As indicated by the use of dashed lines, block 505 and other blocks utilizing dashed lines are optional in some embodiments. Thus, the operations 500 optionally include, at block 505, determining that an attempt to create a peering or direct connection between a virtual network and another network failed due to an address space conflict between the networks. A peering can be a connection between two virtual networks within a service provider system such that the endpoints within the virtual networks can freely communicate as if they both were in a same virtual network. A direct connection can similarly "join" two networks, albeit likely across an intermediate network such as the internet, in which case the connection may be encrypted. In some embodiments, a user may submit a request to create a peering or direct connection (e.g., a VPN connection) between a virtual network, which may be in a service provider system, and another network. The another network may be a virtual network within the service provider system, an external customer network that is outside the service provider system. The failure may result from an address space of the virtual network at least partially overlapping with an address space of the another network. The failure may be detected by attempting to create the connection and detecting an error that prevents the connection from being generated, creating the connection and detecting that at least some traffic sent between the two networks is not properly being received, etc. The flow may continue to optional block 510, or in some embodiments, may flow directly to block 515.

At block 510, the operations 500 optionally include receiving, via an application programming interface (API), a request to migrate an existing network address space for the virtual network. The request identifies the virtual network and may indicate a new network address space for the virtual network. In some embodiments, the request is (or is carried by) an HTTP request message sent from a device of a customer to an API endpoint of the service provider system. In some embodiments, the request also includes a hint data structure indicating a configuration and/or layout of entities (e.g., compute instances) the address space. The hint data structure may be JSON formatted and identify, for example, types, numbers, configurations, and/or names of compute instances.

Blocks 515-535 provide auto-migration operations, which may be initiated responsive to block 505, block 510, or another occurrence. At block 515, the operations include, adding the new network address space for the virtual network. The new network address space may be of a same size (i.e., include a same number of addresses) as the existing network address space, though the new network address space does not overlap with the address space of the another network whereas the existing network address space does.

The operations 500 optionally include, at block 520, creating one or more subnets within the new network address space that correspond to another one or more subnets within the existing network address space. Each subnet may correspond to one of the existing subnets, and can be the same size and created within a same portion of the new network address space (e.g., at the beginning, at the middle) as where the corresponding subnet exists within the existing network address space.

The operations 500 may include, at block 555, utilizing new network addresses in the new network address space. Block 555 may include blocks 525 and 530, or blocks 521 and 522, or a combination thereof.

In some embodiments, the operations 500 may include proceeding to block 525, which includes instantiating one or more compute instances in the one or more subnets that correspond to another one or more compute instances within the existing network address space. Each of the one or more compute instances may correspond to one of the another compute instances, and may be instantiated based on a snapshot/image of the another compute instance or may be re-created in another manner (e.g., launching a default/stock instance, installing/deploying software and/or data to the new compute instance).

In some embodiments, any configurations (e.g., virtual firewall rules) or entities (e.g., routes) within the virtual network that reference the another one or more compute instances within the existing network address space can be updated to instead reference the "new" one or more compute instances of the new network address space.

At block 530, the operations 500 include, terminating the another one or more compute instances. Block 530 can be performed in portions, such as by terminating an existing compute instance when the "new" compute instance is fully instantiated. Block 530 can alternatively be performed in a batch manner, such as when all "new" compute instances have been fully instantiated. Block 530 can include sending one or more commands to one or more hypervisors or offload cards to cause the recipient to terminate the compute instance(s). Optionally, at block 532, the another one or more subnets that were within the existing network address space can be removed.

For some or all compute instances, in some embodiments, the operations 500 may include proceeding to block 521 and/or block 522. At block 521, virtual network configurations settings are updated. For example, block 521 may include one or more of updating virtual network mappings for the virtual network (e.g., updating private network addresses used in mappings between public network addresses and private network addresses), virtual firewall mappings (e.g., updating firewall rules from pertaining to an "old" network address to the "new" network address), other data structures describing the virtual network, etc. At block 522, one or more compute instances are caused to update their network addresses to be in the new address space. In some embodiments, block 522 includes providing, to one or more agents executed in/by the one or more compute instances, an indication that the agent(s) are to cause the corresponding compute instance(s) to utilize a new network address. The indication may specify the new network address to be used, and/or may specify a subnet within the new address space. The indication may be provided to the agent(s) in a variety of ways, such as by having the agents periodically poll an API or monitor the contents of a data structure, pushing a notification to an agent using a "push" technique known to those of skill in the art, etc. Similarly, the agent(s) can cause the compute instance(s) to update their network addresses by executing scripts, invoking operating system commands/utilities (e.g., ipconfig, ifconfig, dhclient), updating a data structure to change a static network address used by the compute instance, etc.

At block 535, the operations include, removing the existing network address space from the virtual network, which can include removing the existing network address space from one or more configuration locations (e.g., routes of one or more routers) and/or a service provider system record store. The operations may optionally further continue to optional blocks 540 and/or 545.

The operations 500 optionally include, at block 540, receiving a request to create a peering or direct connection between the virtual network and the another network. In some embodiments, the request is (or is carried by) an HTTP request message sent from a device of a customer via an API of the service provider system. The request may have been issued responsive to the user selecting a user interface element (e.g., a button) of a console, which may comprise a web application implemented at least in part by the service provider system and presented to the user via the device.

The operations 500 optionally include, at block 545, creating the peering or direct connection between the virtual network and the another network. The address spaces of the virtual network and the another network no longer conflict/overlap due to the auto-migration operations 550. In some embodiments, block 545 may automatically be performed upon the conclusion of the auto-migration operations 550, though in other embodiments block 545 may be performed responsive to block 540.

Figure 6:
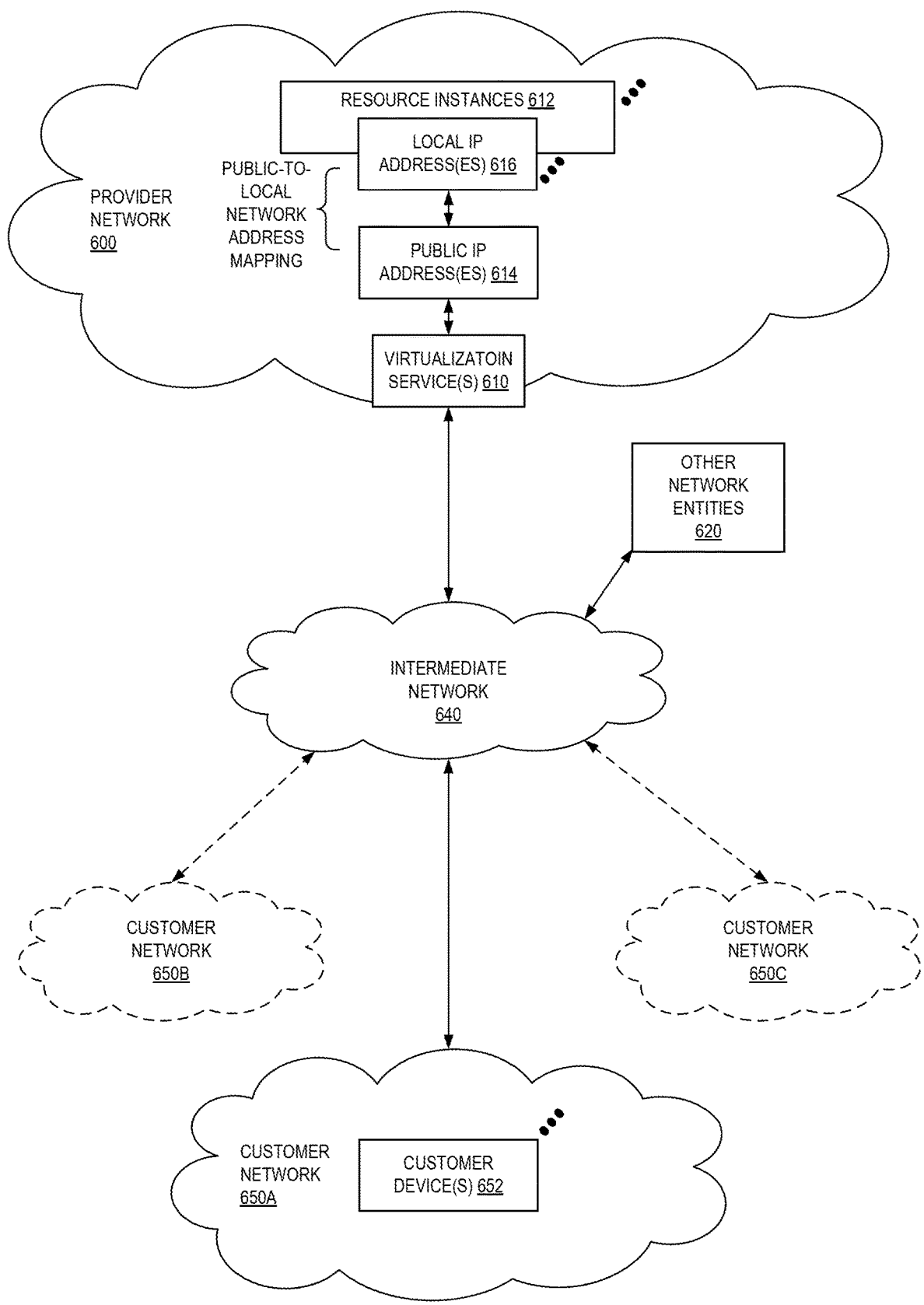
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local IP addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide Network Address Translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
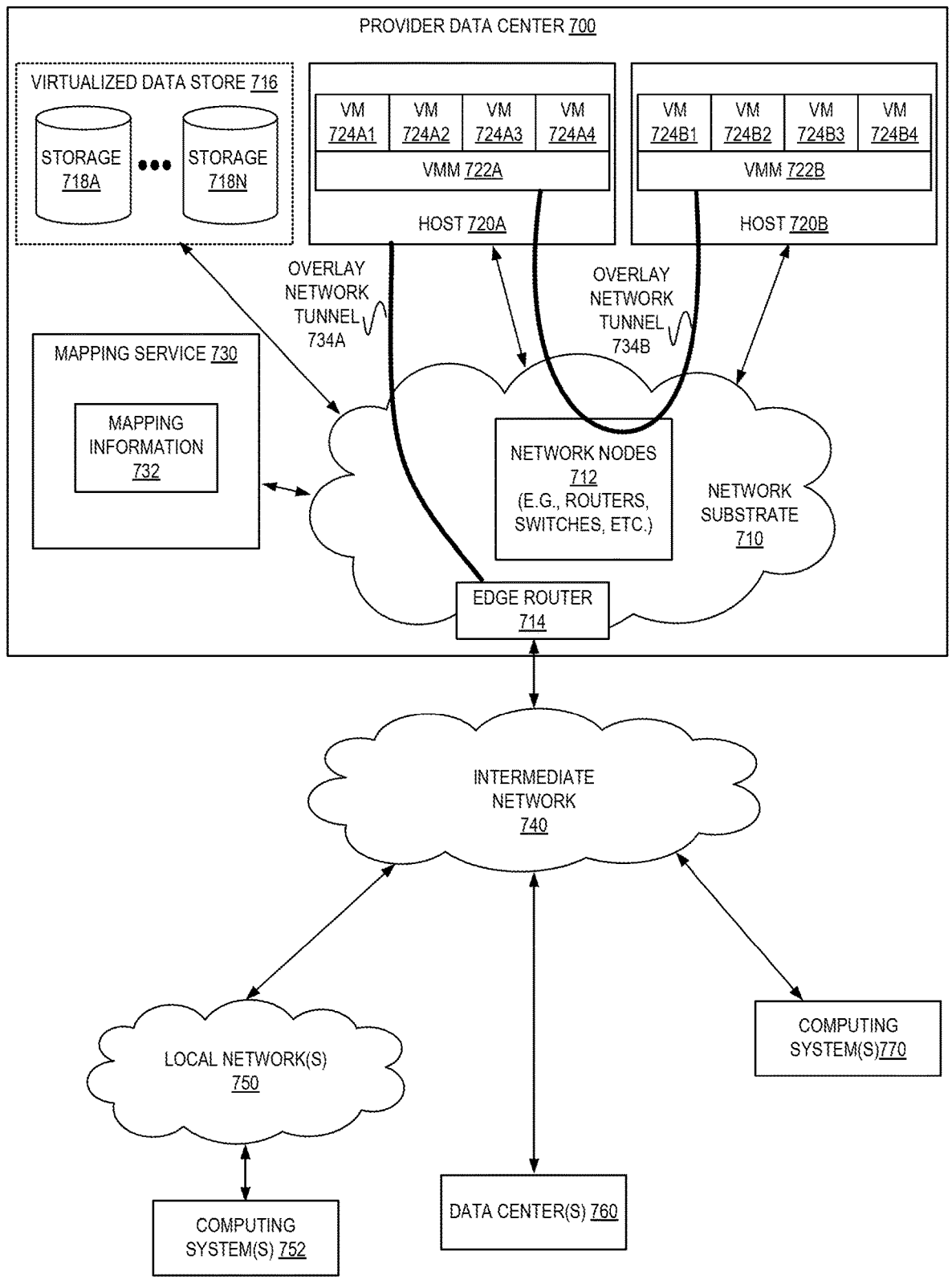
FIG. 7 illustrates an example data center that implements an overlay network on a network substrate using IP tunneling technology according to some embodiments.

FIG. 7 illustrates an example data center that implements an overlay network on a network substrate using IP tunneling technology, according to some embodiments. A provider data center 700 may include a network substrate that includes networking nodes 712 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 710 using tunnels. The IP tunneling technology may provide a mapping and encapsulating system for creating an overlay network on a network (e.g., a local network in data center 700 of FIG. 7) and may provide a separate namespace for the overlay layer (the public IP addresses) and the network substrate 710 layer (the local IP addresses). Packets in the overlay layer may be checked against a mapping directory (e.g., provided by mapping service 730) to determine what their tunnel substrate target (local IP address) should be. The IP tunneling technology provides a virtual network topology (the overlay network);

the interfaces (e.g., service APIs) that are presented to customers are attached to the overlay network so that when a customer provides an IP address to which the customer wants to send packets, the IP address is run in virtual space by communicating with a mapping service (e.g., mapping service 730) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 7, an example overlay network tunnel 734A from a VM 724A (of VMs 724A1-724A4, via VMM 722A) on host 720A to a device on the intermediate network 750 and an example overlay network tunnel 734B between a VM 724A (of VMs 724A1-724A4, via VMM 722A) on host 720A and a VM 724B (of VMs 724B1-724B4, via VMM 722B) on host 720B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 7, at least some networks in which embodiments may be implemented may include hardware virtualization technology that enables multiple operating systems to run concurrently on a host computer (e.g., hosts 720A and 720B of FIG. 7), i.e. as virtual machines (VMs) 724 on the hosts 720. The VMs 724 may, for example, be executed in slots on the hosts 720 that are rented or leased to customers of a network provider. A hypervisor, or virtual machine monitor (VMM) 722, on a host 720 presents the VMs 724 on the host with a virtual platform and monitors the execution of the VMs 724. Each VM 724 may be provided with one or more local IP addresses; the VMM 722 on a host 720 may be aware of the local IP addresses of the VMs 724 on the host. A mapping service 730 may be aware of (e.g., via stored mapping information 732) network IP prefixes and IP addresses of routers or other devices serving IP addresses on the local network. This includes the IP addresses of the VMMs 722 serving multiple VMs 724. The mapping service 730 may be centralized, for example on a server system, or alternatively may be distributed among two or more server systems or other devices on the network. A network may, for example, use the mapping service technology and IP tunneling technology to, for example, route data packets between VMs 724 on different hosts 720 within the data center 700 network; note that an interior gateway protocol (IGP) may be used to exchange routing information within such a local network.

In addition, a network such as the provider data center 700 network (which is sometimes referred to as an autonomous system (AS)) may use the mapping service technology, IP tunneling technology, and routing service technology to route packets from the VMs 724 to Internet destinations, and from Internet sources to the VMs 724. Note that an external gateway protocol (EGP) or border gateway protocol (BGP) is typically used for Internet routing between sources and destinations on the Internet. FIG. 7 shows an example provider data center 700 implementing a network that provides resource virtualization technology and that provides full Internet access via edge router(s) 714 that connect to Internet transit providers, according to some embodiments. The provider data center 700 may, for example, provide customers the ability to implement virtual computing systems (VMs 724) via a hardware virtualization service and the ability to implement virtualized data stores 716 on storage resources 718A-718N via a storage virtualization service.

The data center 700 network may implement IP tunneling technology, mapping service technology, and a routing service technology to route traffic to and from virtualized resources, for example to route packets from the VMs 724 on hosts 720 in data center 700 to Internet destinations, and from Internet sources to the VMs 724. Internet sources and destinations may, for example, include computing systems 770 connected to the intermediate network 740 and computing systems 752 connected to local networks 750 that connect to the intermediate network 740 (e.g., via edge router(s) 714 that connect the network 750 to Internet transit providers). The provider data center 700 network may also route packets between resources in data center 700, for example from a VM 724 on a host 720 in data center 700 to other VMs 724 on the same host or on other hosts 720 in data center 700.

A service provider that provides data center 700 may also provide additional data center(s) 760 that include hardware virtualization technology similar to data center 700 and that may also be connected to intermediate network 740. Packets may be forwarded from data center 700 to other data centers 760, for example from a VM 724 on a host 720 in data center 700 to another VM on another host in another, similar data center 760, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 718A-718N, as virtualized resources to customers of a network provider in a similar manner.

Figure 8:
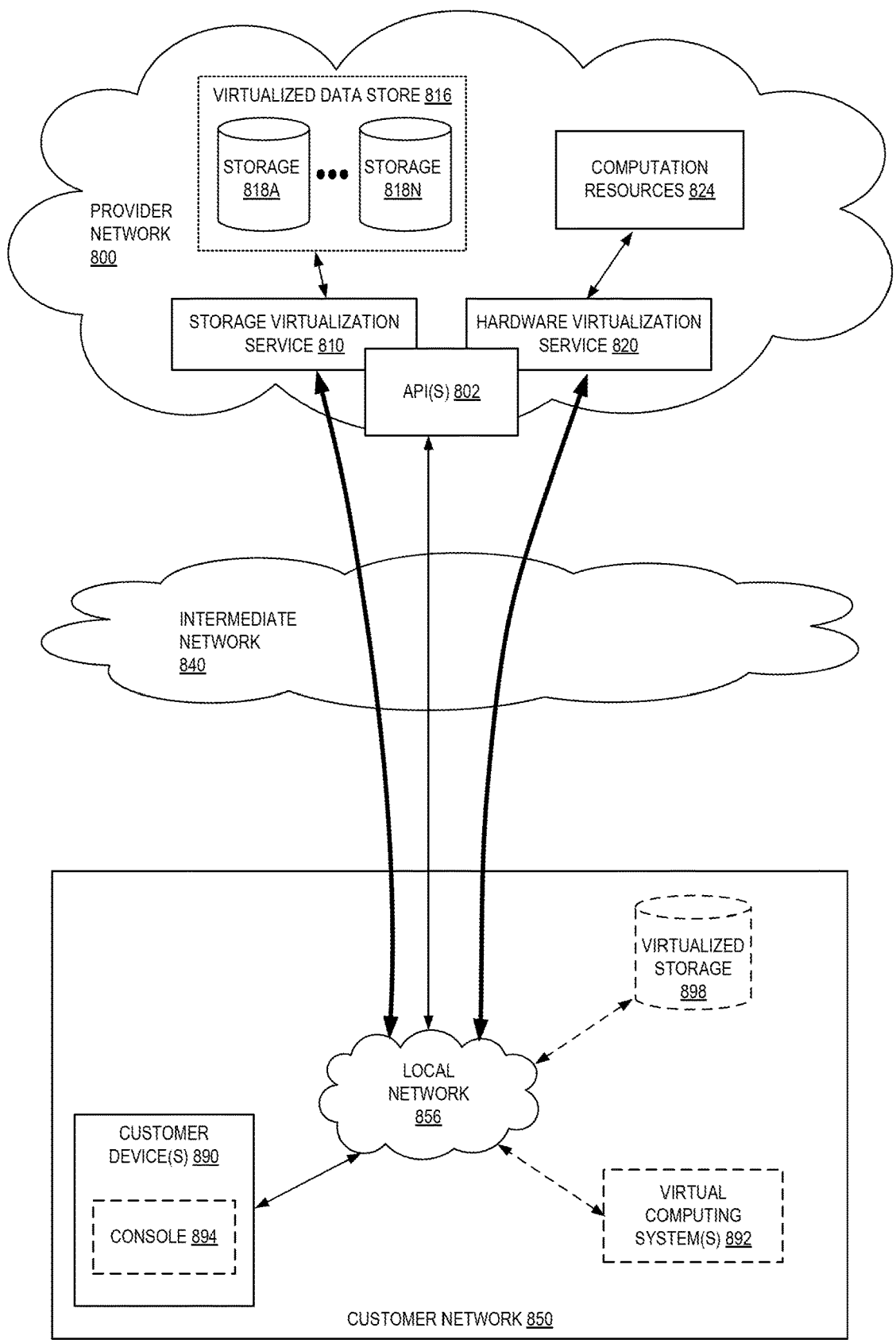
FIG. 8 is a block diagram of an example provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage virtualization service 810, for example via one or more APIs 802, to access data from and store data to storage resources 818A-818N of a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
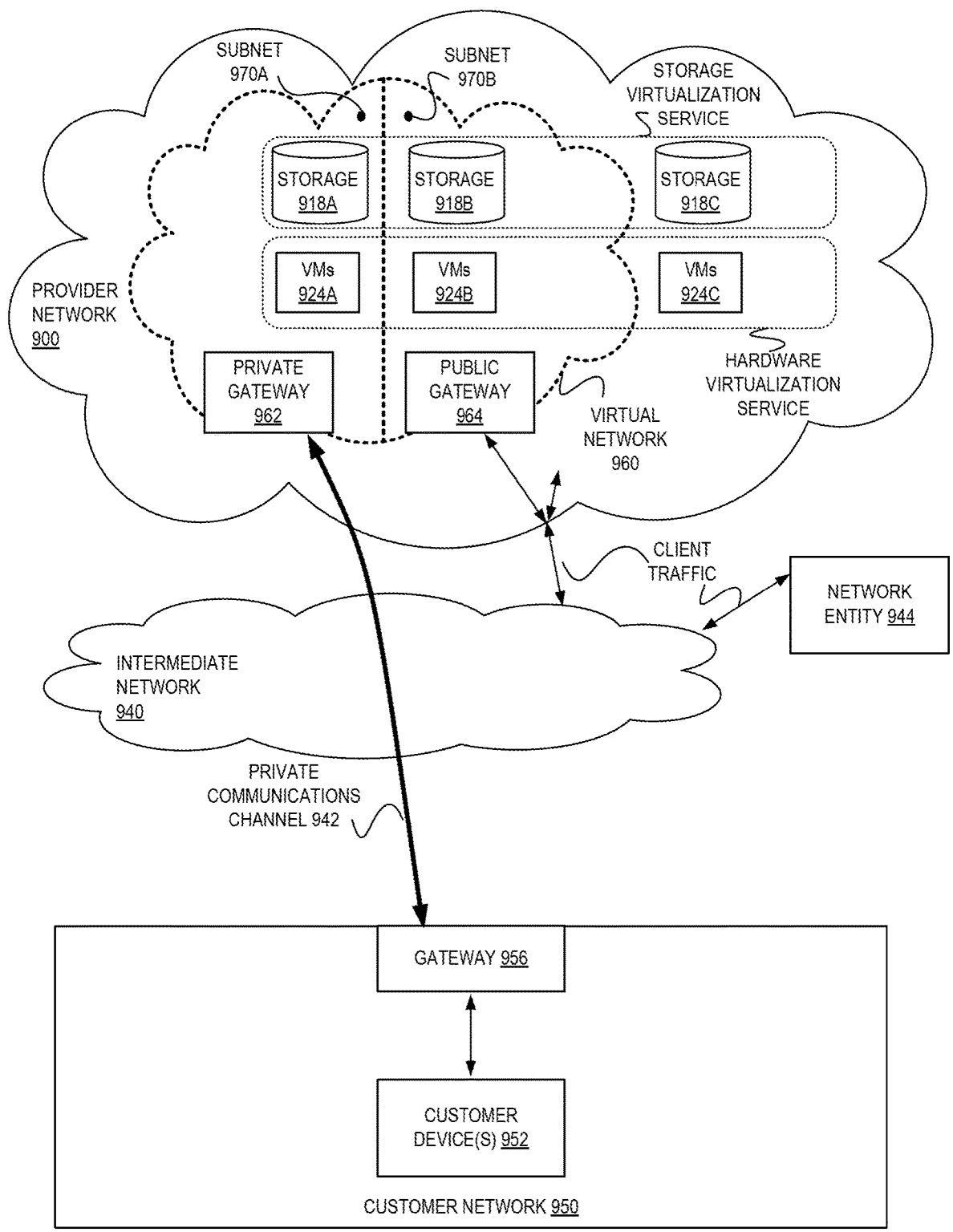
FIG. 9 illustrates an example provider network that provides virtual networks on the provider network to at least some customers according to some embodiments.

FIG. 9 illustrates an example provider network that provides virtual networks on the provider network to at least some customers, according to some embodiments. A customer's virtual network 960 on a provider network 900, for example, enables a customer to connect their existing infrastructure (e.g., one or more customer devices 952) on customer network 950 to a set of logically isolated resource instances (e.g., VMs 924A and 924B and storage 918A and 918B), and to extend management capabilities such as security services, firewalls, and intrusion detection systems to include their resource instances.

A customer's virtual network 960 may be connected to a customer network 950 via a private communications channel 942. A private communications channel 942 may, for example, be a tunnel implemented according to a network tunneling technology or some other technology over an intermediate network 940. The intermediate network may, for example, be a shared network or a public network such as the Internet. Alternatively, a private communications channel 942 may be implemented over a direct, dedicated connection between virtual network 960 and customer network 950.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 960 for a customer on provider network 900, one or more resource instances (e.g., VMs 924A and 924B and storage 918A and 918B) may be allocated to the virtual network 960. Note that other resource instances (e.g., storage 918C and VMs 924C) may remain available on the provider network 900 for other customer usage. A range of public IP addresses may also be allocated to the virtual network 960. In addition, one or more networking nodes (e.g., routers, switches, etc.) of the provider network 900 may be allocated to the virtual network 960. A private communications channel 942 may be established between a private gateway 962 at virtual network 960 and a gateway 956 at customer network 950.

In some embodiments, in addition to, or instead of, a private gateway 962, virtual network 960 may include a public gateway 964 that enables resources within virtual network 960 to communicate directly with entities (e.g., network entity 944) via intermediate network 940, and vice versa, instead of or in addition to via private communications channel 942.

Virtual network 960 may be, but is not necessarily, subdivided into two or more subnetworks, or subnets, 970. For example, in implementations that include both a private gateway 962 and a public gateway 964, a virtual network 960 may be subdivided into a subnet 970A that includes resources (VMs 924A and storage 918A, in this example) reachable through private gateway 962, and a subnet 970B that includes resources (VMs 924B and storage 918B, in this example) reachable through public gateway 964.

The customer may assign particular customer public IP addresses to particular resource instances in virtual network 960. A network entity 944 on intermediate network 940 may then send traffic to a public IP address published by the customer; the traffic is routed, by the provider network 900, to the associated resource instance. Return traffic from the resource instance is routed, by the provider network 900, back to the network entity 944 over intermediate network 940. Note that routing traffic between a resource instance and a network entity 944 may require network address translation to translate between the public IP address and the local IP address of the resource instance.

Some embodiments may allow a customer to remap public IP addresses in a customer's virtual network 960 as illustrated in FIG. 9 to devices on the customer's external network 950. When a packet is received (e.g., from network entity 944), the network 900 may determine that the destination IP address indicated by the packet has been remapped to an endpoint on external network 950 and handle routing of the packet to the respective endpoint, either via private communications channel 942 or via the intermediate network 940. Response traffic may be routed from the endpoint to the network entity 944 through the provider network 900, or alternatively may be directly routed to the network entity 944 by the customer network 950. From the perspective of the network entity 944, it appears as if the network entity 944 is communicating with the public IP address of the customer on the provider network 900. However, the network entity 944 has actually communicated with the endpoint on customer network 950.

While FIG. 9 shows network entity 944 on intermediate network 940 and external to provider network 900, a network entity may be an entity on provider network 900. For example, one of the resource instances provided by provider network 900 may be a network entity that sends traffic to a public IP address published by the customer.

Figure 10:
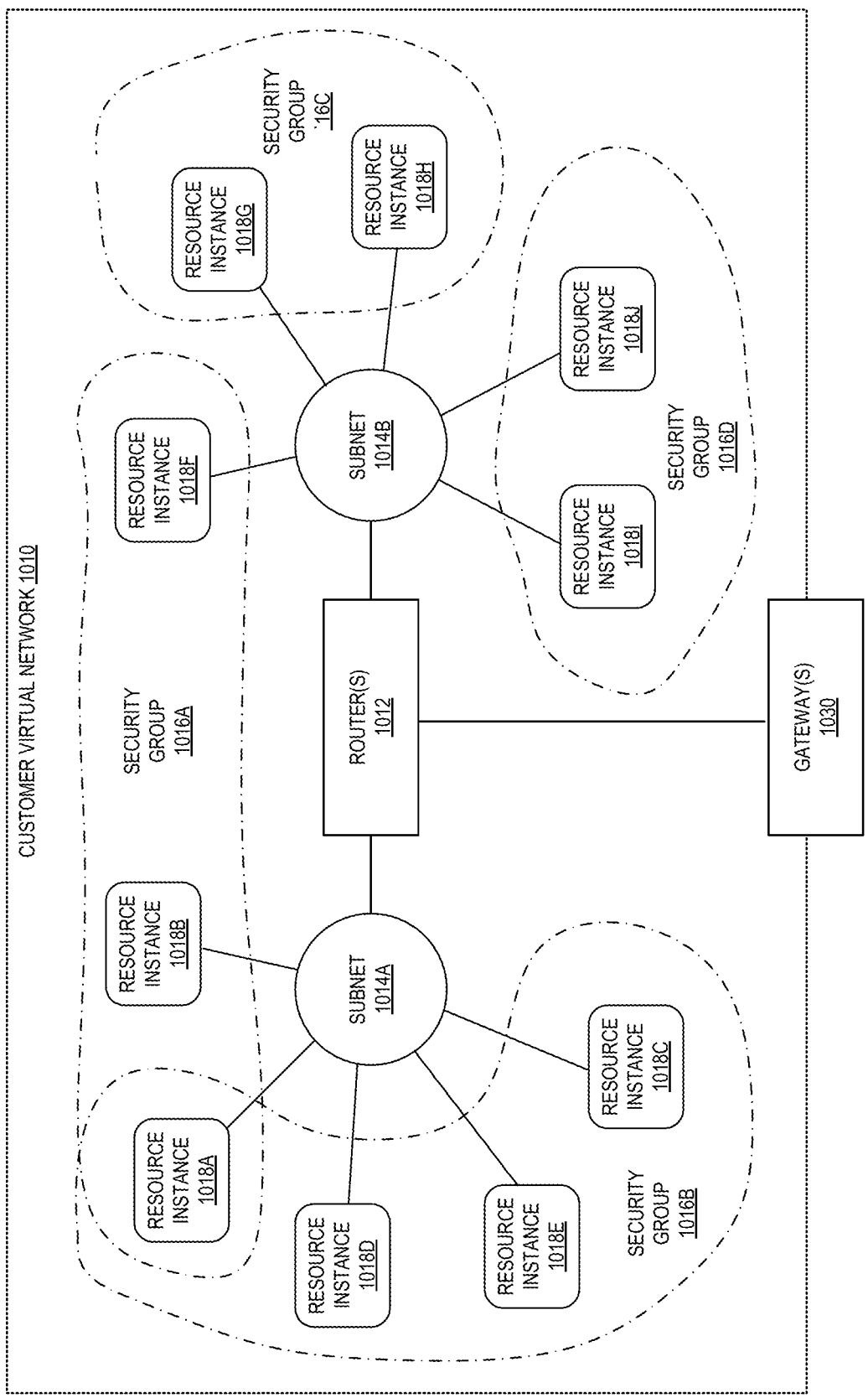
FIG. 10 illustrates subnets and security groups in an example virtual network on a provider network according to some embodiments.

FIG. 10 illustrates subnets and security groups in an example virtual network 1010 on a provider network, according to some embodiments. In some embodiments, a provider network such as provider network 900 in FIG. 9 may allow the customer to establish and manage virtual security groups 1016 (e.g., 1016A-1016D) within the customer's virtual network 1010, within or across subnets 1014. A security group 1016 is a logical grouping of resource instances 1018 and acts as a virtual firewall that controls the traffic allowed to reach one or more resource instances 1018 within the security group 1016 according to security group rules. The customer may establish one or more security groups 1016 within the virtual network 1010, and may associate each resource instance 1018 in the virtual network 1010 with one or more of the security groups 1016. In some embodiments, the customer may establish and/or modify rules for each security group 1016 that control the inbound traffic allowed to reach the resource instances 1018 associated with the security group 1016.

In the example virtual network 1010 shown in FIG. 10, the virtual network 1010 is subdivided into two subnets 1014A and 1014B. Access to the virtual network 1010 is controlled by gateway(s) 1030. Each subnet 1014 may include at least one router 1012 that acts to route traffic to (and from) resource instances 1018 on the respective subnet 1014. In some embodiments, network access control lists (ACLs) may be used to control access to the subnets 1014 at router(s) 1012. In the example shown in FIG. 10, resource instances 1018A through 1018E are on subnet 1014A, and resource instances 1018F through 1018J are on subnet 1014B. The customer has established four security groups 1016A through 1016D. As shown in FIG. 10, a security group may extend across subnets 1014, as does security group 1016A that includes resource instances 1018A and 1018B on subnet 1014A and resource instance 1018F on subnet 1014B. In addition, a resource instance 1018 may be included in two or more security groups 1016, as is resource instance 1018A which is included in security group 1016A and 1016B.

Illustrative System

Figure 11:
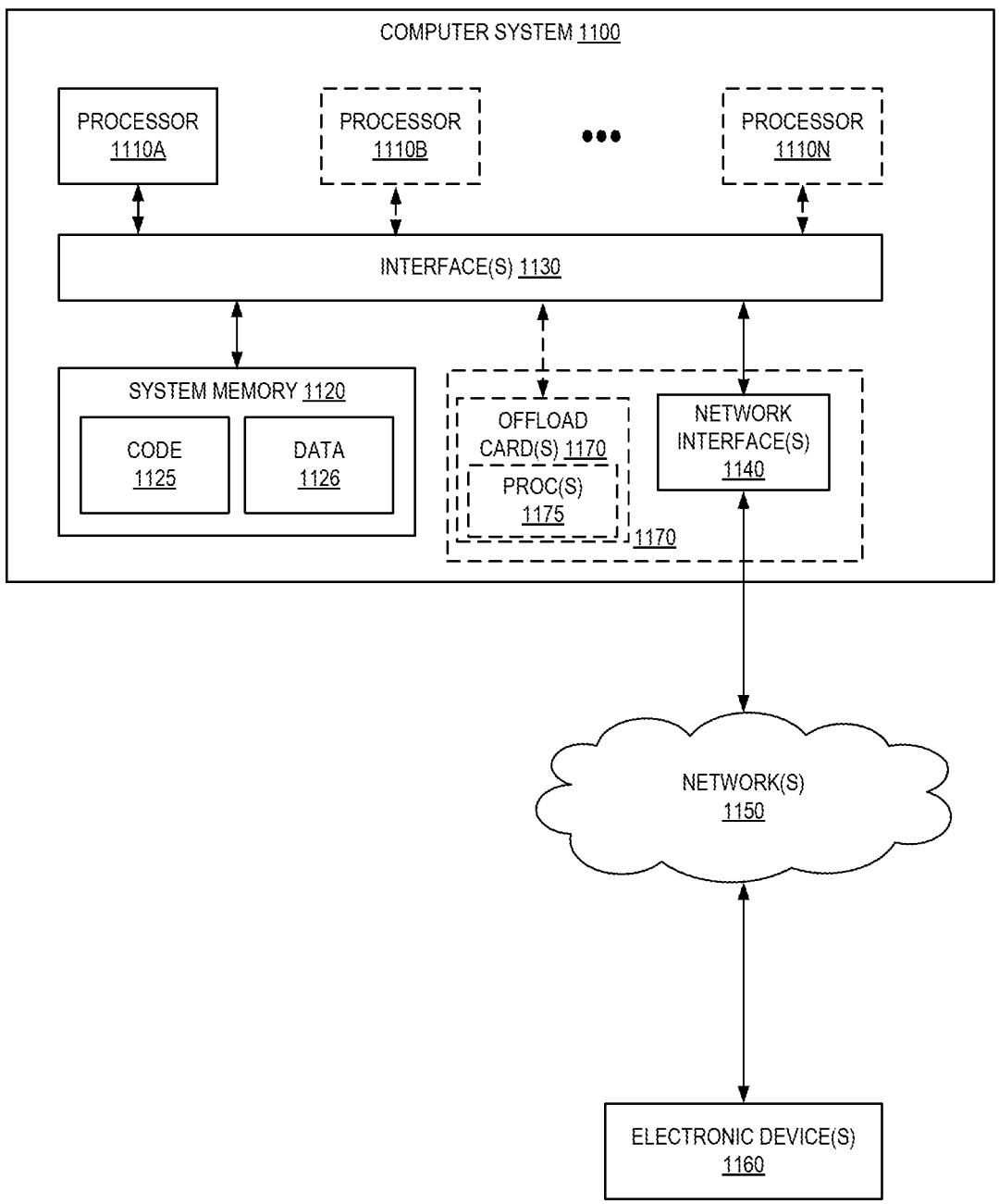
FIG. 11 is a block diagram illustrating an example computer system that may be used in some embodiments.

In some embodiments, a system that implements a portion or all of the techniques for virtual network address space auto-migration as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities, and may not coordinate with (or service) any hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 116A-116B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, via an application programming interface (API), a request to migrate an existing network address space for an existing virtual network implemented in a service provider system, wherein the request identifies the existing virtual network and a new network address space for the existing virtual network;
   adding the new network address space for the existing virtual network;
   creating one or more subnets within the new network address space that correspond to existing one or more subnets of the existing virtual network within the existing network address space;
   causing one or more compute instances of the existing virtual network to utilize one or more network addresses within the one or more subnets;
   removing the another one or more subnets; and
   removing the existing network address space from the existing virtual network.

2. The computer-implemented method of claim 1, further comprising:
   prior to the receiving of the request to migrate the existing network address space, receiving a request to connect the existing virtual network with another network, wherein the another network is a virtual network in the service provider system or a network that is external to the service provider system, wherein the existing network address space and a network address space of the another network partially or completely overlap; and
   sending a message indicating that the existing virtual network was unable to be successfully connected to the another network.

3. The computer-implemented method of claim 1, further comprising:
   after the receiving of the request to migrate the existing network address space, receiving a third request to connect the existing virtual network with another network, wherein the another network is a virtual network in the service provider system or a network that is external to the service provider system, wherein the existing network address space and a network address space of the another network partially or completely overlap, and wherein the new network address space and the network address space of the another network do not overlap; and
   connecting the virtual network with the another network.

4. A computer-implemented method comprising:
   determining that an address space conflict exists between a customer network and an existing network address space allocated to an existing virtual network in a provider network;
   adding a new network address space for the existing virtual network in the provider network;

causing one or more compute instances of the existing virtual network to utilize one or more network addresses within the new network address space; and removing the existing network address space from the existing virtual network.

5. The computer-implemented method of claim 4, wherein determining that the address space conflict exists between a customer network and an existing network address space allocated to an existing comprises:

receiving, via an application programming interface (API), a request to migrate the existing network address space for the existing virtual network, wherein the request identifies the existing virtual network and the new network address space for the existing virtual network, and wherein the existing virtual network is implemented in a service provider system.

6. The computer-implemented method of claim 5, further comprising:

receiving, via the API from a client, a request to describe a status of the migration of the existing network address space for the existing virtual network to the new network address space; and sending, to the client, a response indicating the status of the migration.

7. The computer-implemented method of claim 5, further comprising:

receiving, via the API from a client, a request to rollback the migration of the existing network address space for the existing virtual network to the new network address space;

adding another network address space to the existing virtual network that corresponds to the existing network address space;

causing the one or more compute instances to utilize another one or more network addresses within the another network address space;

removing the new network address space from the existing virtual network.

8. The computer-implemented method of claim 5, wherein the request further includes one or more values indicating at least one of a structure of the existing virtual network, a configuration of the existing virtual network, one or more services provided by the service provider system that are used by or within the existing virtual network, or a part of network that should not be included in migration.

9. The computer-implemented method of claim 4, further comprising at least one of:

modifying or adding one or more rules of one or more virtual firewalls for the one or more compute instances;

creating or modifying at least one route for a router for the one or more compute instances;

configuring, within the new network address space, at least one network address to be used for a Domain Name Service (DNS) server; or configuring a load balancer to perform load balancing involving at least one of the one or more compute instances based at least in part on one or more network addresses of the at least one compute instance.

10. The computer-implemented method of claim 4, wherein causing the one or more compute instances of the existing virtual network to utilize the one or more network addresses within the new network address space comprises:

instantiating the one or more compute instances to correspond to an existing one or more compute instances of the existing virtual network within the existing network address space; and terminating the existing one or more compute instances.

11. The computer-implemented method of claim 4, wherein causing the one or more compute instances of the existing virtual network to utilize the one or more network addresses within the new network address space comprises:

updating one or more configuration settings associated with the existing virtual network based on the one or more network addresses; and causing the one or more compute instances to change from using another one or more network addresses in the existing network address space to instead use the one or more network addresses within the new network address space.

12. The computer-implemented method of claim 4, wherein the existing network address space is an Internet Protocol (IP) version 4 (IPv4) address space, and wherein the new network address space is an IP version 6 (IPv6) address space.

13. The computer-implemented method of claim 4, wherein the existing virtual network is in a service provider system, and wherein the method further comprises:

receiving a request to connect the existing virtual network with another network that is external to the service provider system, wherein the existing network address space and a network address space of the another network partially or completely overlap, and wherein the new network address space and the network address space of the another network do not overlap; and connecting the existing virtual network with the another network.

14. The computer-implemented method of claim 4, further comprising:

creating one or more subnets within the new network address space that correspond to another one or more subnets within the existing network address space.

15. The computer-implemented method of claim 4, wherein the existing virtual network is in a service provider system, and wherein the method further comprises:

receiving a request to connect the existing virtual network with another network, wherein the another network is another virtual network in the service provider system, wherein the existing network address space and a network address space of the another network partially or completely overlap, and wherein the new network address space and the network address space of the another network do not overlap; and connecting the virtual network with the another network.

16. A system comprising:

one or more compute instances implemented by a first one or more electronic devices that operate within an existing virtual network implemented in a service provider system; and a control plane implemented by a second one or more electronic devices of the service provider system, wherein the control plane comprises instructions which, when executed by the second one or more electronic devices, cause the control plane to:

determine that an address space conflict exists between a customer network and an existing network address space allocated to an existing virtual network in the service provider system;

add a new network address space for the existing virtual network in the service provider system;

cause one or more compute instances of the existing virtual network to utilize one or more network addresses within the new network address space; and remove the existing network address space from the existing virtual network.

17. The system of claim 16, the control plane is to determine that the need exists to migrate the existing network address space based at least in part on a receipt, via an application programming interface (API), of a request to migrate the existing network address space for the existing virtual network.

18. The system of claim 17, wherein the request identifies the existing virtual network and the new network address space for the existing virtual network.

19. The system of claim 17, wherein the request further includes one or more values indicating at least one of a structure of the existing virtual network, a configuration of the existing virtual network, or one or more services provided by the service provider system that are used by or within the existing virtual network.

20. The system of claim 16, wherein the instructions further cause the control plane to:
- responsive to a receipt of a request to connect the existing virtual network with another network, connect the virtual network with the another network,
- wherein the another network is a virtual network in the service provider system or a network that is external to the service provider system,
- wherein the existing network address space and a network address space of the another network partially or completely overlap, and
- wherein the new network address space and the network address space of the another network do not overlap.

* * * * *